(12) United States Patent
Tian

(10) Patent No.: US 11,635,825 B2
(45) Date of Patent: Apr. 25, 2023

(54) METHODS FOR GAME/APPLICATION CONTROL USING FOOT GESTURES

(71) Applicant: Xin Tian, Niskayuna, NY (US)

(72) Inventor: Xin Tian, Niskayuna, NY (US)

(73) Assignee: Xin Tian, Niskayuna, NY (US)

( * ) Notice: Subject to any disclaimer, the term of this patent is extended or adjusted under 35 U.S.C. 154(b) by 0 days.

(21) Appl. No.: 17/350,864

(22) Filed: Jun. 17, 2021

(65) Prior Publication Data

US 2021/0397273 A1    Dec. 23, 2021

Related U.S. Application Data

(60) Provisional application No. 63/134,122, filed on Jan. 5, 2021, provisional application No. 63/079,560, filed on Sep. 17, 2020, provisional application No. 63/044,204, filed on Jun. 25, 2020, provisional application No. 63/040,232, filed on Jun. 17, 2020.

(51) Int. Cl.
*A63F 13/211*    (2014.01)
*G06F 3/033*    (2013.01)

(52) U.S. Cl.
CPC .......... *G06F 3/0334* (2013.01); *A63F 13/211* (2014.09)

(58) Field of Classification Search
CPC .............................. A63F 13/211; G06F 3/0334
See application file for complete search history.

(56) References Cited

U.S. PATENT DOCUMENTS

| | | | |
|---|---|---|---|
| 2004/0009814 A1* | 1/2004 | Kim | A63F 13/214 463/36 |
| 2010/0035688 A1* | 2/2010 | Picunko | G06F 3/011 463/30 |
| 2011/0199393 A1* | 8/2011 | Nurse | G06F 3/017 345/665 |
| 2012/0229382 A1* | 9/2012 | Matsunaga | A63F 13/428 345/158 |
| 2014/0035888 A1* | 2/2014 | Levasseur | A63F 13/214 345/184 |
| 2015/0355709 A1* | 12/2015 | Lee | G06F 3/0346 345/156 |
| 2016/0262485 A1* | 9/2016 | Walker | A61B 5/6807 |
| 2017/0300132 A1* | 10/2017 | Hiroi | A43B 3/34 |
| 2019/0339791 A1* | 11/2019 | Alanajadah | G06F 3/0334 |

* cited by examiner

*Primary Examiner* — David L Lewis
*Assistant Examiner* — Shauna-Kay Hall
(74) *Attorney, Agent, or Firm* — Anova Law Group, PLLC

(57) ABSTRACT

Foot-gesture-based movement control method for a game character includes a four-way movement start control process, including: determining the game character being in a non-moving state; obtaining foot tilt angles and tilt states of left and right feet of a user; determining a tilt state change of each foot of the user; and generating movement start controls in first, second, third, and fourth directions for the game character, respectively when the right foot is detected changing from a leveled state to a positively tilted state and changing from a leveled state to a negatively tilted state, the left foot is detected changing from a leveled state to a positively tilted state and changing from a leveled state to a negatively tilted state.

20 Claims, 9 Drawing Sheets

Left Footwear

Right Footwear

METHODS FOR GAME/APPLICATION CONTROL USING FOOT GESTURES

CROSS-REFERENCES TO RELATED APPLICATIONS

This application claims the priority of U.S. Provisional Patent Application No. 63/040,232, filed on Jun. 17, 2020, U.S. Provisional Patent Application No. 63/044,204, filed on Jun. 25, 2020, U.S. Provisional Patent Application No. 63/079,560, filed on Sep. 17, 2020, and U.S. Provisional Patent Application No. 63/134,122, filed on Jan. 5, 2021. All of the above enumerated patent applications are incorporated herein by reference.

FIELD OF THE DISCLOSURE

The present disclosure generally relates to the field of electronic systems, more particularly, relates to methods and devices for foot-gesture-based controls for electronic devices, applications and games.

BACKGROUND

Controls in electronic devices, applications and games determine the ways how users interact with the devices, applications, games, etc., which to a large extent determine user experiences. Conventional device, application, and game controls are mostly achieved with hand-operated controllers and input devices, such as keyboard, mouse, touch screen, game pad, joysticks, etc. However, hand operated controllers cannot get user's foot actions involved in the control experiences. There are also cases when it is inconvenient to use hand-operated controllers, or it is more desirable and natural to use user foot gestures for control purposes. For example, in Virtual Reality (VR) games, it is much more natural for a user to control movement of the game character in the VR game space using his/her feet, which helps achieve more immersive VR experiences. In sport video games and home fitness applications, it is also desirable to have user/player's foot actions involved. In application scenarios where it is hard or inconvenient to operate a hand-operated controller, foot-gesture-based controls may offer great alternative control solutions. The present disclosure provides foot-gesture-based control methods for various application/game control purposes to deliver natural and responsive control experiences.

BRIEF SUMMARY OF THE DISCLOSURE

One aspect of present disclosure provides a foot-gesture-based movement control method for a game character, applied to a game device. The method includes a four-way movement start control process, including: determining the game character being in a non-moving state; obtaining a first foot tilt angle of left foot and a second foot tilt angle of right foot of a user; determining a first tilt state of the left foot and a second tilt state of the right foot, based on the first foot tilt angle and the second foot tilt angle; and determining a tilt state change of each of the right foot and the left foot of the user, when the right foot is detected changing from a leveled state to a positively tilted state, generating a movement start control in a first direction for the game character, when the right foot is detected changing from a leveled state to a negatively tilted state, generating a movement start control in a second direction for the game character, when the left foot is detected changing from a leveled state to a positively tilted state, generating a movement start control in a third direction for the game character, and when the left foot is detected changing from a leveled state to a negatively tilted state, generating a movement start control in a fourth direction for the game character.

Another aspect of present disclosure provides a game device. The game device includes a memory, configured to store program instructions for performing a foot-gesture-based movement control method for a game character; and a processor, coupled with the memory. When executing the program instructions, the processor is configured to perform a four-way movement start control process, including: determining the game character being in a non-moving state; obtaining a first foot tilt angle of left foot and a second foot tilt angle of right foot of a user; determining a first tilt state of the left foot and a second tilt state of the right foot, based on the first foot tilt angle and the second foot tilt angle; and determining a tilt state change of each of the right foot and the left foot of the user, when the right foot is detected changing from a leveled state to a positively tilted state, generating a movement start control in a first direction for the game character, when the right foot is detected changing from a leveled state to a negatively tilted state, generating a movement start control in a second direction for the game character, when the left foot is detected changing from a leveled state to a positively tilted state, generating a movement start control in a third direction for the game character, and when the left foot is detected changing from a leveled state to a negatively tilted state, generating a movement start control in a fourth direction for the game character.

Another aspect of present disclosure provides a non-transitory computer-readable storage medium, containing program instructions for, when executed by a processor, performing a foot-gesture-based movement control method for a game character. The method includes performing a four-way movement start control process, including: determining the game character being in a non-moving state; obtaining a first foot tilt angle of left foot and a second foot tilt angle of right foot of a user; determining a first tilt state of the left foot and a second tilt state of the right foot, based on the first foot tilt angle and the second foot tilt angle; and determining a tilt state change of each of the right foot and the left foot of the user, when the right foot is detected changing from a leveled state to a positively tilted state, generating a movement start control in a first direction for the game character, when the right foot is detected changing from a leveled state to a negatively tilted state, generating a movement start control in a second direction for the game character, when the left foot is detected changing from a leveled state to a positively tilted state, generating a movement start control in a third direction for the game character, and when the left foot is detected changing from a leveled state to a negatively tilted state, generating a movement start control in a fourth direction for the game character.

DETAILED DESCRIPTION

This disclosure presents foot-gesture-based control methods for various applications/games to achieve natural and responsive control experiences. Foot gesture feature information including foot touch states, (2D) foot pointing directions, and foot tilt angles may be used for the detection of user foot gestures (actions) for various control purposes.

Figure 1:
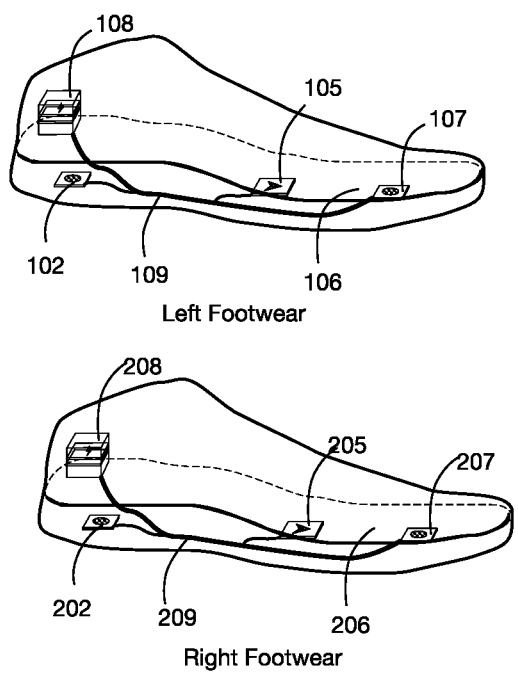
FIG. 1 illustrates an example foot gesture feature information acquisition device according to various embodiments of the present disclosure.

FIG. 1 illustrates an example of foot gesture feature information acquisition device according to various embodiments of the present disclosure. It is a pair of sensors embedded footwear that gathers a set of foot gesture feature information, including foot pointing direction angle(s), foot touch states, foot tilt angle(s), etc. Component 105/205 in left/right foot wearable is a sensor unit, e.g., a 9-axis motion sensor (with 3-axis accelerometer, 3-axis gyro sensor, and 3-axis digital compass). Using measurements from the 9-axis sensor, user foot pointing direction, foot tilt angle, and other foot gesture feature information including foot moving speed, acceleration, moving trajectory may be obtained. Component 102/202, 107/207 are sensors (e.g., pressure sensors or buttons) for detecting whether the user left/right foot sole's fore (ball) part/area and/or heel part/area are pressing the ground (supporting platform), from which foot touch states are derived.

Figure 2:
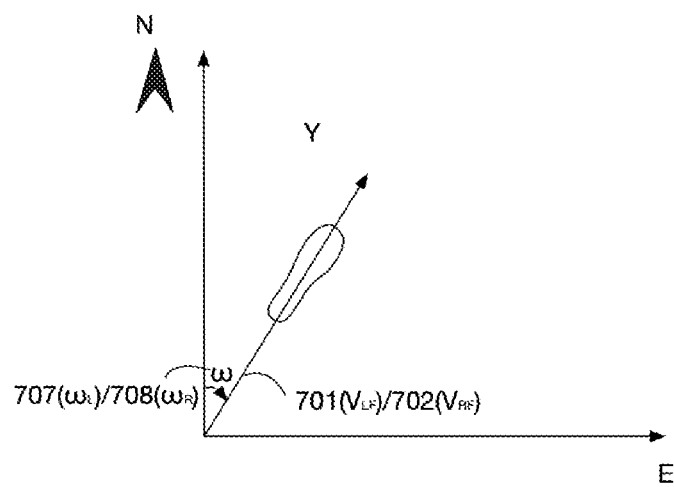
FIG. 2 illustrates foot pointing direction (angle) in a 2D coordinate system according to various embodiments of the present disclosure.

FIG. 2 illustrates foot pointing direction (angle) in a 2D coordinate system according to various embodiments of the present disclosure. Left/right foot pointing direction corresponds to the actual foot pointing direction (represented by a left/right foot pointing direction angle $\omega_L/\omega_R$ (707/708) or a left/right foot pointing direction vector $V_{LF}/V_{RF}$ (701/702)) in a local 2D coordinate system (corresponding to a plane that is parallel to the ground), e.g., the user's local North-East coordinate system as shown in FIG. 2. The local coordinate system does not rotate as the user turns or moves. In this disclosure, terms foot pointing direction and foot pointing direction angle are used interchangeably to refer to foot pointing direction in a user's local 2D coordinate system that corresponds to a plane that is parallel to the ground.

Figure 3A:
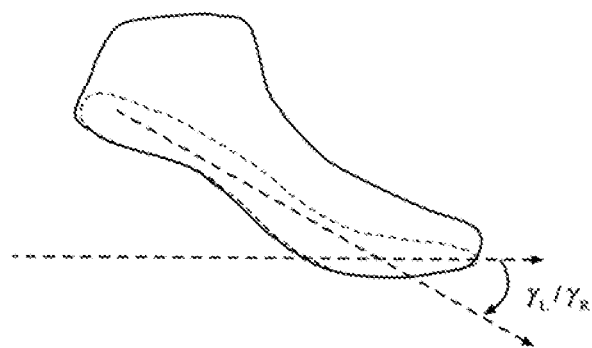
FIG. 3(a) illustrates left/right foot tilt angle in a negatively tilted state according to various embodiments of the present disclosure.
Figure 3B:
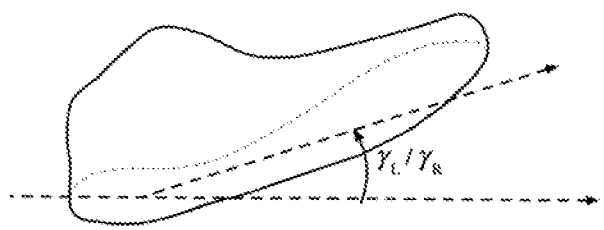
FIG. 3(b) illustrates left/right foot tilt angle in a positively tilted state according to various embodiments of the present disclosure.
Figure 3C:
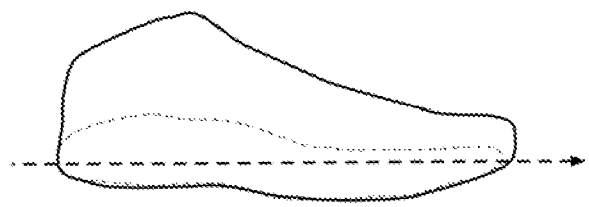
FIG. 3(c) illustrates left/right foot in a leveled state according to various embodiments of the present disclosure.

FIG. 3 illustrates left/right foot tilt angle $\gamma_L/\gamma_R$ and three of foot tilt states according to various embodiments of the present disclosure. FIG. 3(a) illustrates a case when a left/right foot is in a negatively tilted state, where the left/right foot tilt angle $\gamma_L/\gamma_R$ is below a negative threshold. FIG. 3(b) illustrates a case when a left/right foot is in a positively tilted state, where the left/right foot tilt angle $\gamma_L/\gamma_R$ is above a positive threshold. In both FIG. 3(a) and FIG. 3(b) the left/right foot is in a tilted state. FIG. 3(c) illustrates a case when a left/right foot is in a leveled state, where the foot tilt angle $\gamma_L/\gamma_R$ is close to zero.

Figure 4:
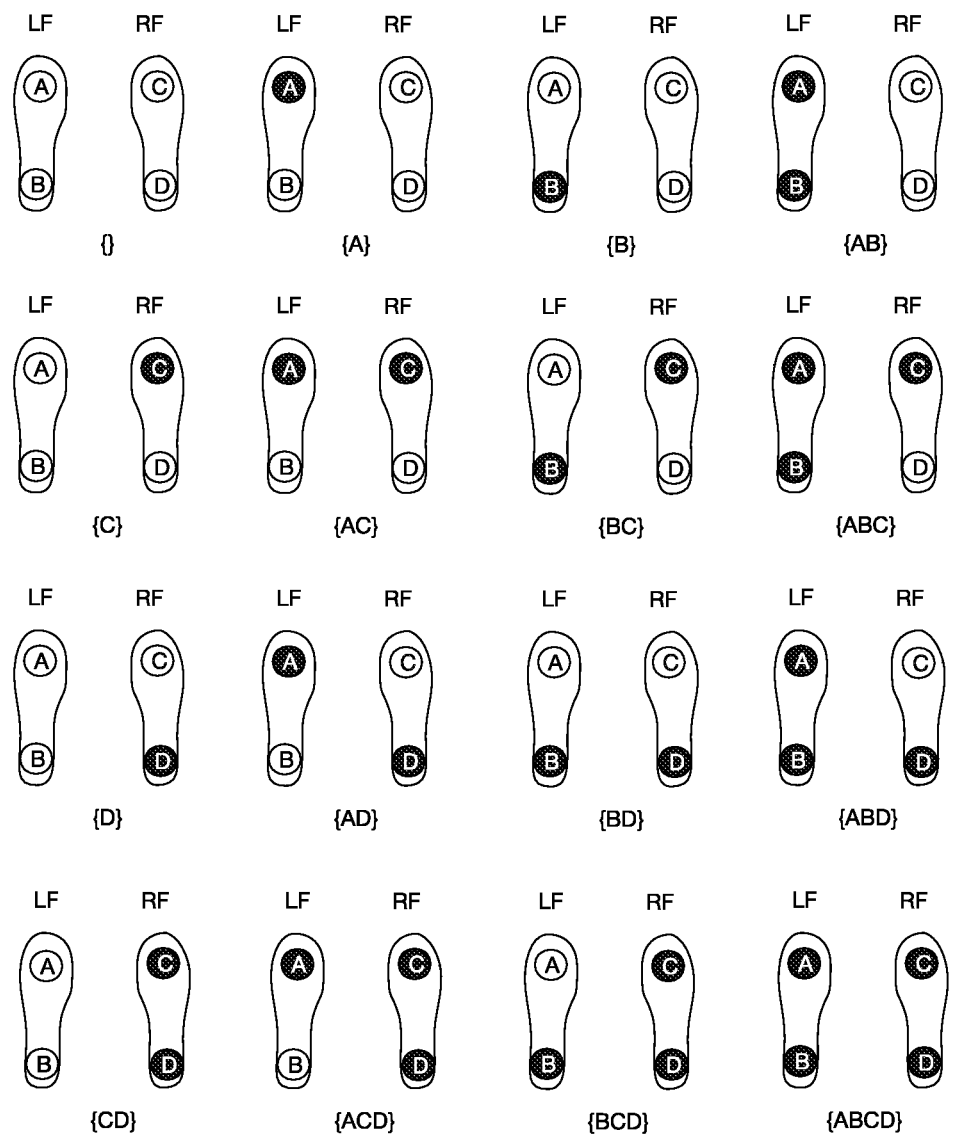
FIG. 4 illustrates an example of foot touch state with 16 Bi-foot foot touch states according to various embodiments of the present disclosure.

FIG. 4 illustrates the concept of foot touch states. According to various embodiments of the disclosure, there are 16 Bi-foot foot touch states of a user's left foot and right foot. Foot sole Area A corresponds to the fore (ball) area/part of a user's left foot sole; Area B corresponds to the heel area/part of the user's left foot. Area C corresponds to the fore (ball) area/part of a user's right foot sole; and Area D corresponds to the heel area/part of the user's right foot sole. In FIG. 4 when an area A, B, C or D is black, the corresponding area of the foot sole is (detected as) pressing the ground or supporting platform. When a foot sole area A, B, C or D is white, corresponding area of the foot sole is (detected as) in the air. In this disclosure, a foot touch state is denoted by the foot sole areas pressing the ground enclosed in a bracket { }. For example, { } denotes a Bi-foot touch state when none of the sole areas is pressing the ground, i.e., both feet are in the air; {A} denotes the case when only user's left foot sole's fore (ball) part is pressing the ground, and the user's right foot is in the air; {ABCD} corresponds to the case when both user's feet are on the ground and all the sole areas A, B, C and D are pressing the ground.

For cases when only foot touch states of one foot are used, a subscript L or R is added to the bracket to indicate it is a left or right foot only touch state, e.g., { }$_L$ indicates a left foot only touch state with user's left foot in the air (i.e., not pressing the ground), {A}$_L$ is a left foot only touch state with the fore (ball) area/part of a user's left foot sole pressing the ground.

Foot touch states of a user, derived from sensor measurements, allow the detection/determination of whether the user's left/right foot is pressing/on the ground (supporting platform) in all foot tilt states (as illustrated in FIG. 3). Note that, in general, more foot touch states can be used if more sensors are added to detect the pressing/un-pressing states at different sole areas. The set of foot touch states presented above is sufficient for the foot-gesture-based control methods in this disclosure.

Figure 15:
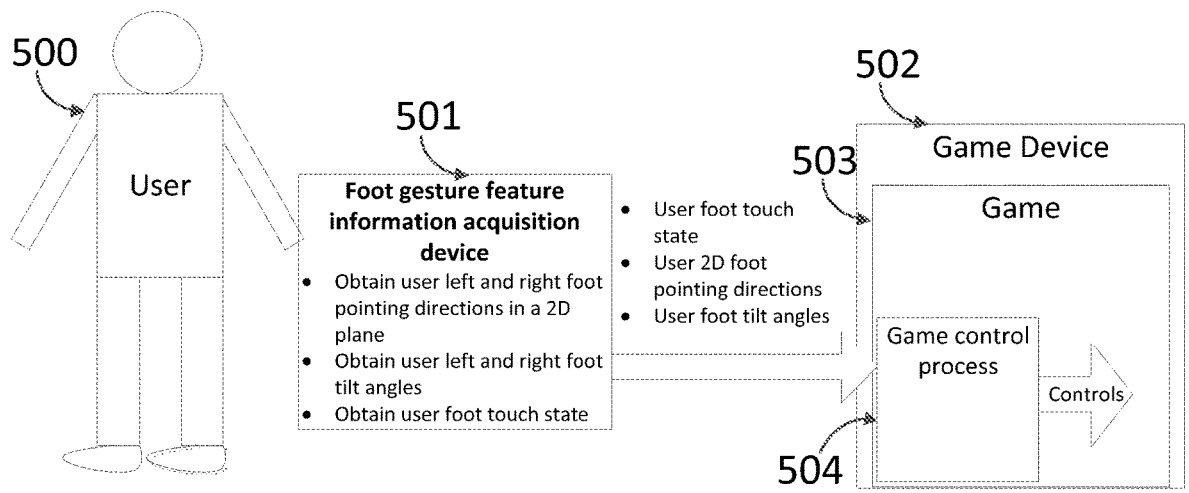
FIG. 15 illustrates an exemplary system configuration for foot-gesture-based game/application control according to various embodiments of the present disclosure.

Using foot gesture feature information including foot touch states, foot pointing direction angles, and foot tilt angles various user foot gestures/actions, including walk, run, jump, step, foot swipe, foot tap etc., can be detected and used for control of games or applications in general. FIG. 15 shows an example setup for foot-gesture-based game/application controls. A foot gesture feature information acquisition device 501 collects foot gesture feature information of a user 500, and send the information to a game device 502. A game control process 504 running on the game device 502 uses the foot gesture feature information from 501 to detect foot gestures performed by the user 500, and translates the detected user foot gestures/actions as controls for a game 503 running on the game device. In various embodiments of the disclosure, the game control process 504 can be part of the game 503 or be a separate process run in parallel with the game 503 on the game device 502. Applications of the disclosed foot-gesture-based control methods are not limited to games. In general, the game device 502 may be an electronic device; the game 503 may be an application running on the electronic device 502; and the game control process 504 may be an application control process, which allows the user 500 to use foot gestures/actions to control the application 503.

For example, the game device may include a memory, configured to store program instructions for performing the disclosed foot-gesture-based control methods for a character in a game. The game device may further include a processor, coupled with the memory and configured to perform the disclosed methods. In embodiments, the memory may include volatile memory such as random-access memory (RAM), and non-volatile memory such as flash memory, hard disk drive (HDD), or solid-state drive (SSD). The memory may also include combinations of various above-described memories. The processor may include a central processing unit (CPU), an embedded processor, a microcontroller, and a programmable device such as an application-specific integrated circuit (ASIC), a field programmable gate array (FPGA), and a programmable logic array (PLD), etc.

Foot-gesture-based control methods for game/application controls are presented, which may be implemented as the game control process 504 to control behaviors/actions of the game/application 503 in various embodiments of the present disclosure. The foot gesture feature information acquisition device 501 is not limited to the sensor embedded footwear as illustrated in FIG. 1. It may be any type of sensor systems, e.g., a video cameras system, which provides the required set of user foot gesture feature information including foot touch states, foot pointing directions, and foot tilt angles.

An important application of foot-gesture-based controls is the control of character movement in games/applications. For example, foot-gesture-based movement controls allow a user to control the game character's movement in VR games with the user's foot actions, which may deliver much more natural and immersive control experiences compared to movement control with hand operated controllers. This disclosure presents methods for responsive, and accurate movement controls based on the detection of user foot gestures.

Character movement controls in games and applications include movement start control, movement direction control, movement speed/type control and movement stop control of a game character. In this disclosure movement direction control is first addressed. Using foot pointing direction(s) of the user's right and/or left foot, character movement direction control in a 2D (two-dimension) plane of the game space may be naturally achieved. The first method of using user foot pointing direction(s) to control movement direction of a character in a 2D plane of a game/application's space is to use a direct mapping from the measured left or right foot pointing direction angle (or a combination of the left foot pointing direction and the right foot pointing direction) to a direction in the application/game's plane. As illustrated in FIG. 2, a user's left/right foot pointing direction (or a combination of the left foot pointing direction and the right foot pointing direction, e.g., the average of the two foot pointing direction angles) has a range of 360 degrees, which can be mapped to a 2D direction (with a 360 degree range) in the game/application's plane as the direction of the game/application character's movement. In order to associate/map the user foot pointing direction to a direction in a game/application's plane (i.e., a 2D space), the following calibration process can be used.

Step 1: the game/application 503 instructs the user 500 to point his/her left/right foot to a direction (picked by the user), which corresponds to a known 2D direction (angle) in game/application space. The known 2D direction in game/application space may be a current moving direction of the character, or an easy to recognize direction in the game/application, etc. For example, in soccer game, the known direction can be one of the length directions of the soccer field.

Step 2: user 500 notifies the game/application 503 that the left/right foot pointing direction has been picked/decided. This can be done in various ways, e.g., by clicking a function button on a hand-operated controller.

Step 3: Upon getting the user notification from Step 2, the game/application 503 obtains the current of left/right foot pointing direction (angle) and uses it as the reference left/right foot pointing direction (angle), e.g., $\omega_{Lref}/\omega_{Rref}$.

After the calibration process, the reference foot pointing direction (angle), e.g., $\omega_{Lref}/\omega_{Rref}$ is set, which corresponds to the known (2D) direction (angle) in the game/application space. The direction in the game/application's 2D space that corresponds to a left/right foot pointing direction (angle) (e.g., $\omega_L$ or $\omega_R$) may be obtained using the angle difference ($\omega_L - \omega_{Lref}$) or ($\omega_R - \omega_{Rref}$) and the known 2D direction (angle) in the game/application space.

In various embodiments of the disclosure, for the step 2 of the calibration process, a foot gesture (performed by the user 500 and detected by the game/application 503, e.g., with a game/application control process 504) may be used to inform application/game to set the reference foot pointing direction(s). A recommended foot-gesture-based method for setting the reference foot pointing direction(s) is described as follows. Check, e.g., by 504, if a user's left/right foot is in a titled state (as illustrated in FIG. 3(*a*) or FIG. 3(*b*)), in which the absolute value of foot tilt angle, i.e., the degree of foot tilt, of the user's left or right foot is larger than a large threshold, e.g., 50 degrees. If the user's left or right foot is determined to stay in the titled state for more than a pre-determined time threshold, e.g., 5 s, set the reference left/right foot pointing direction (angle) $\omega_{Lref}/\omega_{Rref}$ as the measured left/right foot pointing direction angle. The recommended foot-gesture-based method for setting the reference foot pointing direction(s) has the advantage that it is unlikely to be triggered by unintended user foot movement/actions, since it is rare in common foot actions for a user to keep his/her left or right foot in a tilted state with a large degree of foot tilt for a time period that is over a few seconds. As a result, accidental updates of reference foot tilt angle(s) may be avoided. To further avoid accidental triggering of the reference foot pointing direction update, additional requirements on the changing rate of user foot pointing direction(s) (e.g., requiring the changing rate(s) of user foot pointing direction angle(s) to be close to zero) and/or requirements on user's foot touch states (e.g., requiring left and/or right feet to press/touch the ground) may also be added to the recommended foot gesture for setting reference foot pointing direction(s) in applications/games.

Note that the first way for character movement direction control involves the mapping of user foot pointing direction(s) with a 360 degree range directly to a 2D direction in application/game's space. This control method requires the user to be able to turn around freely. In some applications, the requirement can be naturally met, for example, when a user wears a VR headset playing a VR game. As the user turns around in real world, the mapped 2D direction in game/application space will be updated accordingly. However, there are also many application scenarios, where it is inconvenient for a user/player to turn around. For example, when a fixed screen is used for display, the user will not turn away from the screen during the game play. As a result, user left/right foot pointing direction has a much limited range for game control.

In such cases, a reference left/right foot pointing direction (angle), denoted as $\omega_{Lref}/\omega_{Rref}$, may be set by the user. The same calibration process may be used for setting the reference left/right foot pointing direction. In some embodiments of the disclosure, the reference left/right foot pointing direction angle $\omega_{Lref}/\omega_{Rref}$ may be set as the foot pointing direction angle $\omega_L/\omega_R$ when the user's left/right foot is pointing to the display screen. In other embodiments of the disclosure, the reference left/right foot pointing direction angle $\omega_{Lref}/\omega_{Rref}$ can be set as the left/right foot pointing direction angle $\omega_L/\omega_R$ when a character movement in game/application is started. The difference between measured left/right foot pointing direction and the reference foot pointing direction, e.g., $\omega_L - \omega_{Lref}$ or $\omega_R - \omega_{Rref}$ may be used for movement direction controls.

In such cases the range of $\omega_L - \omega_{Lref}$ or $\omega_R - \omega_{Rref}$ is generally much smaller than [−90 90] degree. For character movement direction control, the foot pointing direction (angle) difference $\omega_L - \omega_{Lref}$ or $\omega_R - \omega_{Rref}$ may be used to control the turn rate of the movement direction in a (2D) plane of the game/application space. For example, when $\omega_L - \omega_{Lref}$ or $\omega_R - \omega_{Rref}$ falls in an interval of [−20 20] degree, turn rate of the movement direction in game/application space is zero, i.e., there is no change in moving direction. When $\omega_L - \omega_{Lref}$ or $\omega_R - \omega_{Rref}$ falls in a second range, e.g., [−−50-20] degree, the turn rate of moving direction in a 2D game/application space is −5 degree/second. When $\omega_L - \omega_{Lref}$ or $\omega_R - \omega_{Rref}$ falls in a third range, e.g., [20 50] degree, the turn rate of moving direction in a 2D game/application space is 5 degrees/second. In such a way, user is able to effectively change the movement direction and make turns in a (2D) plane of the game/application space.

In other embodiments of the current disclosure, movement direction controls in games/applications are given as Forward, Backward, Left, or Right direction. The angle difference $\omega_L - \omega_{Lref}$ or $\omega_R - \omega_{Rref}$ and the corresponding foot tilt angle $\gamma_L$ or $\gamma_R$ may be used to generate movement control in four directions. For example, when $\omega_R - \omega_{Rref}$ falls in a first range, e.g, [−15 15] degree, Forward or Backward movement can be started depending on the right foot tilt angle $\gamma_R$; when $\omega_R - \omega_{Rref}$ falls in a second range, e.g., [−50 −20] degree, Right or Left movement may be started depending on the right foot tilt angle $\gamma_R$.

Note that the character movement direction control methods presented above allows the control of the character's movement in a (2D) plane of the game/application space using one foot of the user. In such cases, foot gesture of the other foot of the user may be used to control character movement in Up and Down directions. Jointly, character movement control in 3D game/application space may be achieved. In various embodiments of the disclosure, a game/application character's movement in Up and Down directions of the game/application space may be naturally controlled using left or right foot tilt angle $\gamma_L$ or $\gamma_R$ of the user with a mapping from the foot tilt angle to the speed (or acceleration) of the Up and Down movement.

Besides movement direction control, movement control in games/applications also include movement start control, movement stop control and the control of movement parameters including type, speed, etc. In various embodiments of the disclosure, user's foot gestures/actions including Walk, Run and Jump can be accurately detected and distinguished (e.g., by a game control process 504) using foot touch state information from a foot gesture feature information acquisition device 501.

Foot gesture state {A|B C|D} denotes set of foot touch states when both left foot and right foot of the user are pressing the ground with left foot touch state being $\{A|B\}_L$ and right foot touch state being $\{C|D\}_R$. ($\{A|B\}_L$ indicates A and/or B area(s) of the left foot sole are pressing the ground. $\{C|D\}_R$ denotes C and/or D area(s) of the right foot sole are pressing the ground); Foot gesture state {A|B} denotes a set of (possible/allowed) foot touch states when right foot is in the air, i.e., with right foot touch state being $\{\ \}_R$, and left foot touches/presses the ground (with A and/or B area(s) pressing the ground and left foot touch state as $\{A|B\}_L$); foot gesture state {C|D} denotes the set of foot touch states when user's right foot is pressing the ground and user's left foot is in the air. Foot gesture state { } corresponds to touch state { } with both of user's feet in the air (not pressing the ground). Accordingly, WALK, as foot gesture, has the following sequence of foot gesture states

. . . {A|B C|D}→{A|B}→{A|B C|D}→{C|D}→{A|B C|D}→{A|B}→{A|B C|D}→{C|D} . . .

Note that the sequence of foot gesture states shows the changes/transitions of foot gesture states, which is the changes/transitions of foot gesture states over time. Here, each foot gesture state corresponds to a set of allowed foot touch states of the WALK foot gesture. Mark "→" is used to connect consecutive foot gesture states.

RUN as a foot gesture has the following sequence of foot gesture states:

. . . { }→{A|B}→{ }→{C|D}→{ }→{A|B}→{ }→{C|D} . . .

It can be seen that WALK and RUN foot gestures, share foot gesture states {A|B} and {C|D}. However, they have different foot gesture state sequences. Walk can be detected (confirmed) by the detection of a (minimum length) foot gesture state sequence:
{A|B}→{A|B C|D}→{C|D} or {C|D}→{A|B C|D}→{A|B}

The above sequence of foot gesture states are segments from the foot gesture state sequence of foot gesture WALK, which are feature foot gesture state patterns of the foot gesture. When one of the feature foot gesture state pattern of WALK is detected, e.g., by 504, based on measurements of user foot touch states, foot gesture WALK may be detected and used to start/trigger movement of the (video game) character corresponding to WALK. A longer feature foot gesture state pattern of WALK, e.g., {A|B C|D}→{A|B}→{A|B C|D}→{C|D} may also be used to detect WALK, but it will further reduce the detection speed and make the control less responsive.

For the detection of user's Run foot gesture, the following feature foot gesture state patterns of RUN can be used.
{ }→{A|B}→{ }, { }→{C|D}→{ }, {A|B}→{C|D}, {C|D}→{ }→{A|B}

When one of the above feature foot gesture state patterns of RUN is detected based on measurements of the user's foot touch state measurements, RUN foot gesture can be detected, e.g., by 504, and used to start (trigger) the character's movement corresponding to RUN in the game. A longer feature foot gesture state pattern of RUN, e.g., {A|B}→{ }→{C|D}→{ }, and {C|D}→{}→{A|B}→{ } may be used to detect RUN foot gesture. However this may further reduces the detection speed, but has the advantage of being able to distinguish RUN from single-foot hoop foot gesture.

Note that single-foot hop has foot gesture state patterns: . . . { }→{A|B}→{ }-{A|B}→{ } . . . for left-foot hop and . . . { }→{C|D}→{ }-{C|D}→{ } . . . for right-foot hop. If it is desirable to avoid the detection of single-foot hop foot gesture as RUN, { }→{A|B}→{ }, { }→{C|D}→{ } should not be used for RUN foot gesture detection.

To summarize, in various embodiments of the disclosure, user actions, including run and walk, can be detected as foot gestures by checking if the obtained foot gesture state sequence matches a feature foot gesture state pattern of the corresponding foot gesture. The process involves obtaining measurements of user foot touch states of both left and right foot. Based on a current foot touch state measurement determine a current foot gesture state. Check if the obtained foot gesture state sequence, which is formed by the current and past foot gesture states, matches a feature foot gesture pattern of the foot gesture to be detected. The feature foot gesture state pattern of the foot gesture is a pre-determined segment of the foot gesture state sequence of the foot gesture, e.g. WALK or RUN. When a match with a feature foot gesture state pattern of the foot gesture is detected, the corresponding user foot gesture is detected. The selection of the feature foot gesture state pattern for WALK or RUN detection involves tradeoff between detection speed and detection accuracy. In various embodiments of the disclosure, the detection of a foot gesture such as WALK or RUN can be used to start a corresponding character movement in games and applications.

In various embodiments of the disclosure, the detection of the termination/stop of WALK or RUN foot gesture may be used to stop character movement in games and applications. One way to determine the stop of WALK/RUN is to detect a break of foot gesture state sequence corresponding to WALK/RUN. However, this may lead to large delays. For example, when a user stops walking, the corresponding foot gesture state sequence stops at {A|B C|D} with both feet on ground. In this case, although the user has stopped walking, the WALK foot gesture state sequence is not broken.

A solution to the problem is to use a timeout threshold for foot gesture states. If a detected foot gesture state is not changed for a time period that is over a timeout threshold, denoted as $Tau_E$, the foot gesture, e.g., WALK/RUN may be determined to be ended. However, if the timeout threshold $Tau_E$ is selected too large, significant delays will be introduced for the detection of stop of WALK/RUN foot gesture, which may lead to a large delay in movement stop control. If the timeout threshold is selected too small, false detections of WALK/RRUN termination may happen, which may lead to unwanted movement interruption.

To resolve the problem above, in various embodiments of the disclosure, foot gesture state {A|B C|D} (which include all possible foot touch states when user's both feet are pressing the ground) and a short timeout threshold $Tau_E$, e.g., $Tau_E$=0.2 s, are used for RUN/WALK stop/termination detection. If the user's both feet is detected to press the ground (with foot gesture state {A|B C|D}) for a time period that is more than the timeout threshold $Tau_E$, WALK/RUN foot gesture is determined to be stopped, and a stop control for an ongoing movement of a game/application character may be generated. The disclosed method for stop detection of WALK foot gesture is based on the fact that, in WALK foot gesture, foot gesture state {A|B C|D} has very short time duration, because when a person walks, the time duration when both the person's left and right feet are pressing the ground (corresponding to foot gesture state {A|B C|D}) is very short. In contrast, the other two foot gesture states of WALK, i.e., {A|B} and {C|D}, have much longer time durations. For movement stop control, the use of a short timeout threshold $Tau_E$, e.g., 0.2 s, on foot gesture state {A|B C|D} will not lead to false Walk stop detections.

For RUN foot gesture, the same stop detection method as for WALK can be used. Note that {A|B C|D} is not a foot gesture state of RUN. The detection of foot gesture state {A|B C|D} is a break of foot gesture state sequence of RUN foot gesture, which indicates the termination of the RUN. In addition, user's walk/run action normally and naturally stops at foot gesture state {A|B C|D}, the disclosed method for WALK/RUN stop detection provides natural and responsive detection and control performance.

The methods disclosed above for movement start and stop control by detecting the start and stop of WALK/RUN foot gesture allow a user to naturally control character movement with his/her walk/run actions. However, the methods have a few drawbacks. First, the detection of Walk/Run action can only start movement in one direction, e.g., a "Forward" direction. It may not be used to start backward or sideway movements. Second, the detection of Walk/Run action may involve significant delays with the detection methods in this disclosure or other Walk/Run detection methods. Regardless of the detection method, user's walk or run actions can only be detected (confirmed) after the user start walking/running for one or two steps. The delay in the detection of Walk/Run action can be around 1 second, which is not suitable for character movement controls with high requirements on time accuracy and responsiveness.

To address the first drawback, the detection of the following left/right-foot step action (foot gesture) can be used to start sideway movements. For example, Left-foot step has the following foot gesture state sequence. . . . {A|B C|D}→{C|D}→{A|B C|D}→{C|D}→{A|B C|D}→{C|D}→{A|B C|D} . . .

To confirm the detection of the left-foot step foot gesture and distinguish the foot gesture from WALK the following feature foot gesture state pattern of the left-foot step can be used to detect left-foot step, {A|B C|D}→{C|D}→{A|B C|D}→{C|D}

In various embodiments of the disclosure, the detection of the feature foot gesture state pattern above using user foot touch state measurements may be used to confirm the detection of the left-foot step foot gesture and to naturally start/trigger sideway move toward a direction, e.g., left. A longer feature foot gesture state pattern can be used to detect left-foot step, e.g., {A|B C|D}→{C|D}→{A|B C|D}→{C|D}→{A|B C|D}, however, it may reduce detection speed and make the control less responsive.

However, the detection of WALK, RUN and left/right-foot step of a user for movement start control all involve significant delays. To resolve the problem, in various embodiments of the disclosure, foot-tilt-angle-based methods may be used for accurate and responsive movement start control in games and applications.

Figure 5:
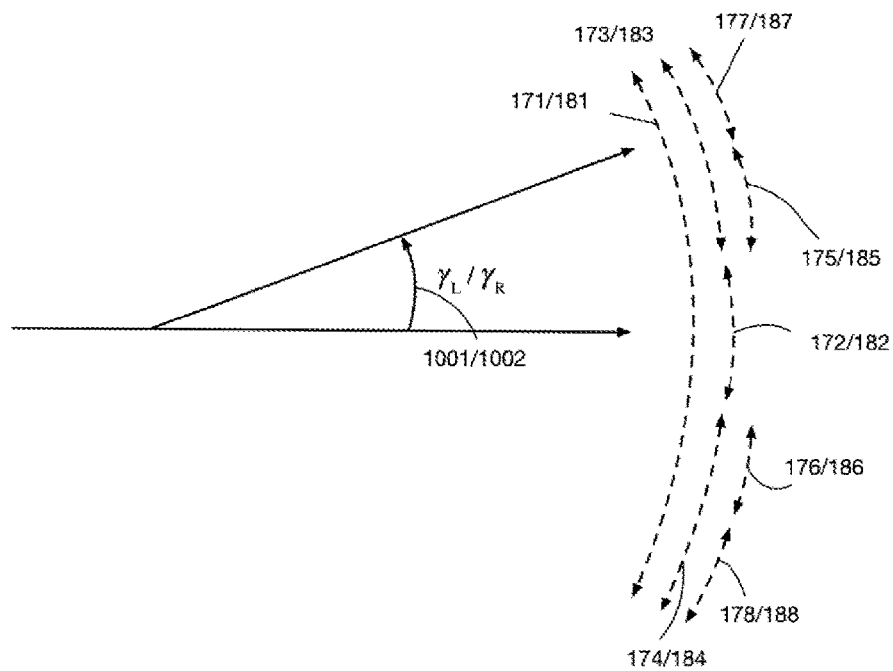
FIG. 5 illustrates a method for using left/right foot tilt angle for movement start and/or stop control according to various embodiments of the present disclosure.

User's left/right foot tilt angle theoretically has a range between [−90 90] degree. In practice the range of foot tilt angel is much smaller. FIG. 5 illustrates a scheme for the use of left/right foot tilt angle for movement start, end, and type control, where the range of Left/Right foot tilt angle $\gamma_L/\gamma_R$ is divided into multiple sub-ranges. When measured foot tilt angle $\gamma_L/\gamma_R$ falls in a sub-range, a corresponding movement control may be generated.

As shown in FIG. 5, angle range 171/181 is a predetermined range of user's left/right foot tilt angle $\gamma_L/\gamma_R$. Sub-range 172/182 is a range that the absolute value of the foot tilt angle, i.e., the degree of foot tilt, is small (close to zero), which corresponds to the leveled state in FIG. 3(c). When user's left/right foot tilt angle $\gamma_L/\gamma_R$ falls in sub-range 172/182, a movement stop control may be generated.

When the (measured) user left/right foot tilt angle $\gamma_L/\gamma_R$ falls in sub-range 174/184, the user's left/right foot heel is up and fore part of left/right foot sole is down (which corresponds to a negatively tilted state as in FIG. 3(a)). In this case a movement start control in a direction, e.g., a forward direction, may be generated.

When the (measured) user left/right foot tilt angle $\gamma_L/\gamma_R$ falls in Sub-range 173/183, the user's left/right foot heel is down and the fore part of left/right foot sole is up (which corresponds to a positively tilted state as in FIG. 3(b)). In this case a movement start control in a direction, e.g., a backward direction, may be generated.

The predefined sub-ranges 172/182, 173/183, 174/184 allow the conversion of the left/right foot tilt angle (measurement) to one of three states, and can be naturally used for control of movement along a movement direction, against a movement direction and movement stop. As illustrated in FIG. 5 additional sub-ranges for the foot tilt angle, e.g., 175/185, 176/186, 177/187, 178/188, can be defined to support more types/detailed of movement controls. For example, when user's left/right foot tilt angle $\gamma_L/\gamma_R$ falls in sub-range 177/187 or 178/188, speed of the movement may be increased.

In other embodiments of the disclosure, left/right foot tilt angle can be used to control the acceleration of the movement. For example, when left/right foot tilt angle is in range 172/182, there is zero acceleration; when left/right foot tilt angle is in range 174/184 a positive acceleration may be applied to the movement to increase movement speed in a movement direction; and when left/right foot tilt angle is in range 173/183 a negative acceleration may be applied to the movement to reduce movement speed in a movement direction.

The foot-tilt-angle-based methods disclosed above for movement start, stop and type control may offer responsive control performance, since foot tilt angle changes can be detected with little delays. However, the movement control methods may require the user to keep a foot in a tilted state during the movement and they may not allow the user/player to perform walk, run, stepping, and turn actions during the character's movement.

This disclosure presents foot-gesture-based control methods which combine the advantages of the foot-tilt-angle-based movement control and movement control with the detection of foot gestures including WALK and RUN, to achieve natural and responsive movement controls of a character in games/applications with foot actions of a user 500.

Figure 6A:
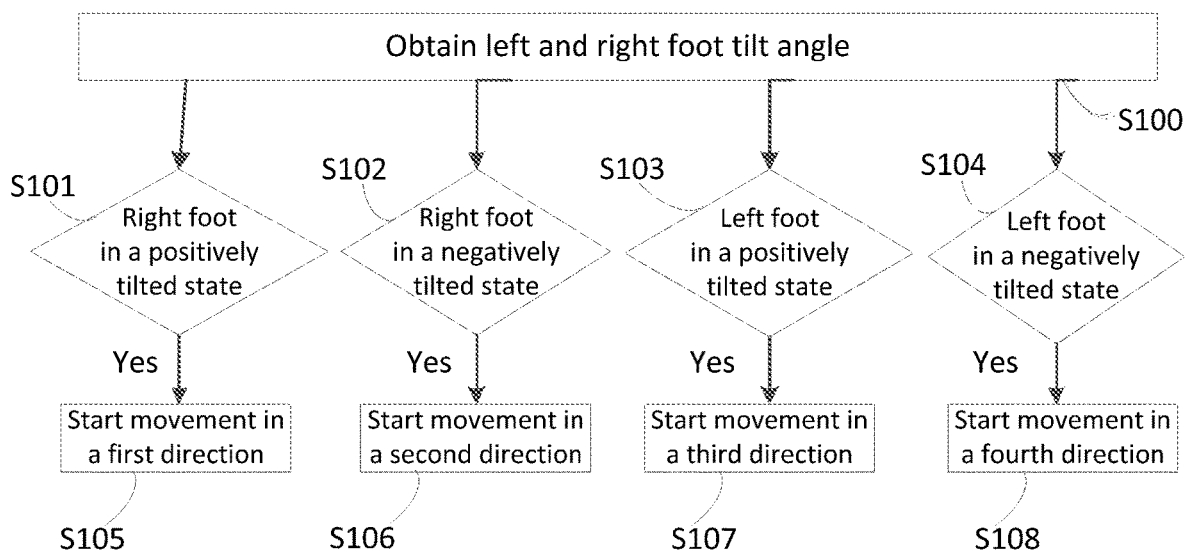
FIG. 6(a) illustrates a four-way movement start control process according to various embodiments of the present disclosure.

FIG. 6(a) illustrates a four-way movement start control process for starting movement of a game character in four possible directions according to various embodiments of the present disclosure. The four directions may be Forward, Backward, Left, and Right. In general, the game character may be a character in any application. In step S100, left foot tilt angle and right foot tilt angle of a user are obtained e.g., from a foot gesture feature information acquisition device. Using the foot tilt angle measurements from S100, in steps S101, S102, S103 and S104, it is determined if the user Left/Right foot tilt angle is in a negatively tilted state (as illustrated in FIG. 3(a)) or a positively tilted state (illustrated in FIG. 3(b)). If the right foot is detected to be in a positively tilted state in S101, step S105 generates a control for starting movement in a first direction, e.g., Backward. If the right foot is detected to be in a negatively tilted state in S102, step S106 generates a control for starting movement in a second direction, e.g., Forward. If the left foot is detected to be in a positively tilted state in S103, step S107 generates a control for starting movement in a third direction, e.g., Left. If the left foot is detected to be in a negatively tilted state in S104, step S108 generates a control for starting movement in a fourth direction, e.g., Right.

Figure 6B:
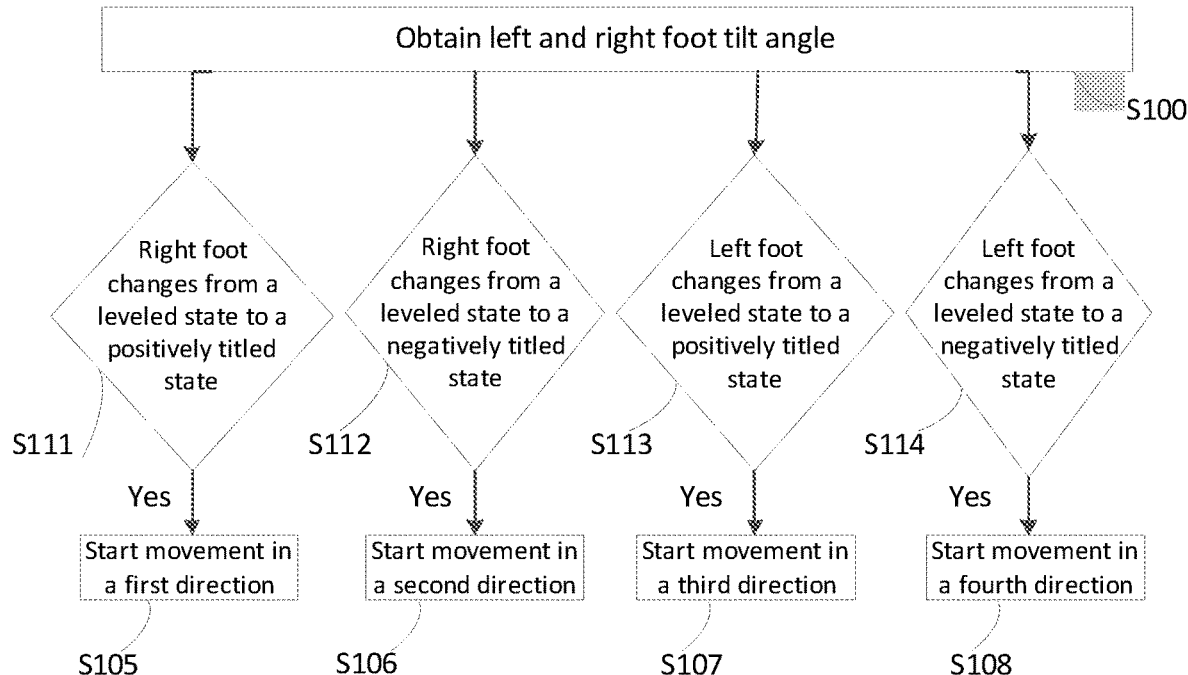
FIG. 6(b) illustrates another four-way movement start control process according to various embodiments of the present disclosure.

In some embodiments of the disclosure, as illustrated in FIG. 6(b), step S111 detects the change of the right foot from a leveled state (as illustrated in FIG. 3(c)) to a positively tilted state (as illustrated in FIG. 3(b)); step S112 detects the change of the right foot from a leveled state to a negatively tilted state (as illustrated in FIG. 3(a)); step S113 detects the change of the left foot from a leveled state (as illustrated in FIG. 3(c)) to a positively tilted state; and step S114 detects the change of the left foot from a leveled state to a negatively tilted state. If a change of foot tilt state is detected in step S111/S112/S113/S114, a corresponding control for starting character movement in one of the four directions will be generated in step S105/S106/S107/S108.

The disclosed four-way movement start control processes (which may be implemented in the game control process 504) allow the use of user foot actions to effectively start movement of a game/application character in four possible directions, e.g., Forward, Backward, Left and Right directions, which is a commonly needed movement control function in many games and applications. The user foot gestures to be detected by the four-way movement start control processes are easy to perform and can be detected with little time delay, which leads to responsive movement start control performance. In comparison, as discussed earlier, the detection of foot gestures such as WALK or RUN will take much longer time and may cause unwanted delays for movement start controls. The disclosed four-way movement start control methods also do not need user foot pointing direction information, which allows the use of user foot pointing direction information for other control purposes such as determining a (2D) reference-Forward-movement direction in the game/application space that determines the directions of the four movement directions in the game/application space.

In embodiments of the four-way movement start control processes, the thresholds for determining the user's foot being in a positively or negatively titled state may be selected to achieve a desired tradeoff between control sensitivity and the chance of false/unintended triggering of movement start control. The chance of unintended triggering of movement start control may be further reduced by adding additional requirements on foot touch states, and change rate of foot pointing direction(s), for the generation of the character movement start controls. For example, it may also be required that one or both of the user's feet need to be detected/determined as pressing the ground for generating a movement start control, which may be determined using foot touch state measurements of the user; it may also be required that the change rates of one or both of the user's the foot pointing directions to be close to zero for generating a movement start control, which reduces the chance of generating unintended character movement start controls when a user turns around to face a different direction.

In various embodiments of the disclosure, the four-way movement start control processes presented above may be used to start character movement when the game/application character is determined to be in a non-moving state. When the game/application character is determined to be in a moving state, the detections of other foot gestures such as WALK, RUN, etc., can be used (e.g., by 504) to control other aspects of the on-going movement such as movement type and/or speed. As presented earlier in this disclosure, user foot gestures including WALK and RUN may be detected (e.g., by 504) using measurements of user foot touch states.

In many games and applications, the directions of movement in a game/application's 2D plane corresponding the four movement directions, e.g., Forward, Backward, Left and Right, may be changed. In many cases, the four directions of movement in the (2D) plane of the game/application's space may be determined in reference to a reference-Forward-movement-direction in the plane of the game/application's space, which corresponds to the Forward direction. When the reference-Forward-movement-direction is changed, the direction of the Forward, Backward, Left, or Right movement in the game/application's space changes accordingly.

In some games and applications, the reference-Forward-movement-direction is controlled by a hand operated device. For example, in many first-person video games, the reference-Forward-movement-direction is determined by the direction of the game character's viewing direction in the game/application space, which may be controlled by a mouse. In many VR applications, the reference-Forward-movement-direction in the game space is controlled by the orientation of the VR headset. In various embodiments of the disclosure, when user foot pointing direction information is available, the reference-Forward-movement-direction may be determined (e.g., by 504) using the left/right foot pointing direction angle of the user 500 (e.g., $\omega_L/\omega_R$) or the combination of the user's left foot pointing direction and right foot pointing direction angles. This allows the decoupling of the controls of the movement direction and viewing direction of the character in games/applications. As a result, a user/player 500 can change the direction that a game/application character is looking at in game/application space without affecting the direction of an ongoing movement of the character, which matches real-life movement control experiences. Note that, in various embodiments of the disclosure, the methods presented earlier for using the foot pointing direction(s) of a user to control character movement direction in games/applications may be used to determine the reference-Forward-movement-direction.

In various embodiments of the disclosure, when a game/application character is determined to be in a moving state (e.g., by 504), the ongoing movement may be stopped using a foot-tilt-angle-based foot gesture. A control to stop the on-going movement may be generated (e.g., by 504) when the left or right foot is detected (e.g., by 504) to change from a leveled sate (as illustrated in FIG. 3(c)) to a tilted state (as illustrated in FIG. 3(a) or FIG. 3(b)). The change of the user's foot from a leveled state to a tilted state is detected when the measured left/right foot tilt angle increases above a positive threshold, or decreases below a negative threshold. The absolute values of the threshold levels may be chosen to be large enough, e.g., 40 degrees, to avoid unintended generation of movement stop controls. Optionally, to avoid unintended generation of the movement stop controls, requirements on foot touch states may be added to require one or both of the left foot and right foot (being detected as) pressing the ground when the movement stop control is generated. This movement stop control process is compatible with the disclosed four-way movement start control process as illustrated in FIG. 6(b) where the detection of tilt state changes of the left foot and the right foot is used (in S111, S112, S113 and S114) for generating movement start controls for the game/application character.

Figure 7:
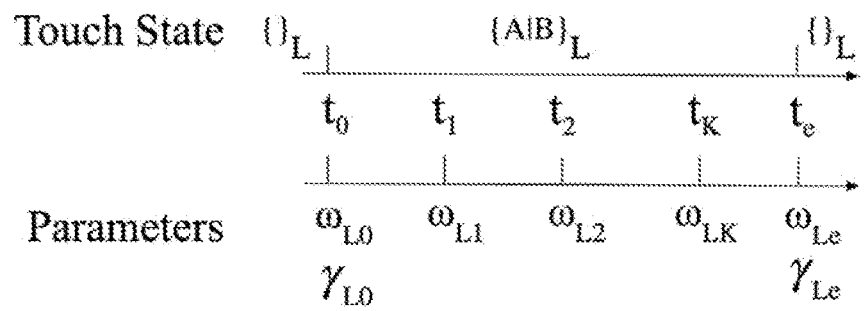
FIG. 7 illustrates an exemplary process of a right foot advanced step-up foot gesture and parameters therefrom according to various embodiments of the present disclosure.

In this disclosure an advanced step-up foot gesture is presented which allows the use of natural step-up foot actions of a user (500) for various game/application control purposes. FIG. 7 illustrates an exemplary process of a right foot advanced step-up foot gesture and parameters therefrom according to various embodiments of the present disclosure. At time t0, the user's right foot is detected (e.g., by 504) to touch/press the ground, i.e., the right foot gesture state is detected changing from $\{\ \}_R$ to $\{C|D\}_R$. The right foot tilt angle at time $t_0$, denoted as $\gamma_{R0}$, and the right foot pointing direction angle at time $t_0$, denoted as $\omega_{R0}$, may be recorded and used as parameters of the advanced step-up foot gesture. When the right foot is detected as pressing the ground (e.g., by 504), i.e., right foot touch state belongs to $\{C|D\}_R$, the right foot tilt state may be detected (e.g., by 504) to change from a leveled state to a tilted state for one or multiple times at time $t_1, t_2, \ldots, t_K$, as the user changes tilt angle of his/her right foot. Note that $t_K$ denotes the time when the last foot tilt state change (from a leveled state to a tilted state) is detected during the foot gesture. At each time of the detection, the corresponding foot pointing direction angle, e.g., $\omega_{R1}, \omega_{R2}, \ldots, \omega_{RK}$, may be obtained as a parameter of the advanced step-up foot gesture. At time $t_e$, the right foot touch state is detected (e.g., by 504) to change from $\{C|D\}_R$ to $\{\ \}_R$, i.e., the right foot is detected to leave (or stop pressing) the ground, which is the end of the right foot advanced step-up foot gesture. The right foot tilt angle at time $t_e$, denoted as $\gamma_{Re}$, and the right foot pointing direction angle at time $t_e$, denoted as $\omega_{Re}$, may be obtained as parameters for the advanced step-up foot gesture. At time $t_e$, a control may be generated from the advanced step-up foot gesture with a set of parameters from $\gamma_{Re}, \omega_{Re}, \gamma_{R0}, \omega_{R1}, \omega_{R2}, \ldots, \omega_{RK}$. In various embodiment of the present disclosure, the set of parameters for the right foot advanced step-up foot gesture include a foot tilt angle $\gamma_{Re}$, a first foot-pointing-direction-angle $\omega_{Re}$, i.e., the foot tilt angle and foot pointing direction angle at time $t_e$, and a second foot-pointing-direction-angle, which is a foot pointing direction angle in $\omega_{R0}, \omega_{R1}, \omega_{R2}, \ldots, \omega_{RK}$. Note that which one of the foot pointing direction angles in $\omega_{R0}, \omega_{R1}, \omega_{R2}, \ldots, \omega_{RK}$ should be used as the second foot-pointing-direction-angle parameter is pre-determined for the foot gesture. It may be the foot pointing direction angle obtained when the foot tilt state change is detected for a pre-determined number of times, e.g., the first time, second time, third time, ..., n-th time, or the last time.

Figure 8:
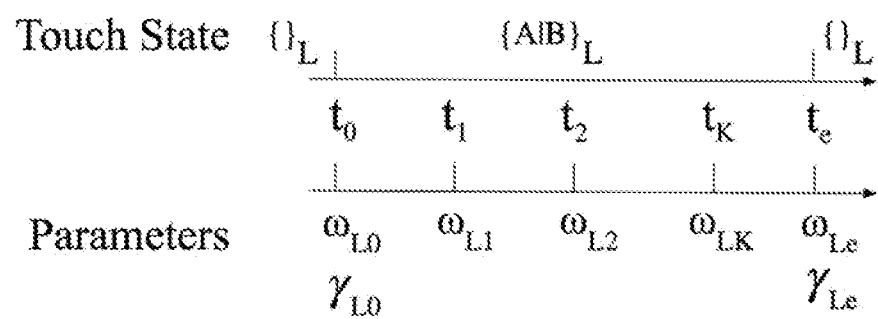
FIG. 8 illustrates an exemplary process of a left foot advanced step-up foot gesture and parameters therefrom according to various embodiments of the present disclosure.

FIG. 8 illustrates left foot advanced step-up foot gesture and control parameters therefrom according to various embodiments of the present disclosure. At time $t_0$, the user's left foot is detected (e.g., by 504) to touch/press the ground, and the foot touch state changes from $\{\ \}_L$ to $\{A|B\}_L$. At time $t_0$, the left foot pointing direction angle, denoted as $\omega_{L0}$, and the left foot tilt angle, denoted as $\gamma_{L0}$, may be obtained and used as parameters for the advanced step-up foot gesture. Then, when the user's left foot presses the ground (the left foot touch state satisfying $\{A|B\}_L$), the user's left foot may be detected (e.g., by 504) to change from a leveled state (as shown in FIG. 3(c)) to a tilted state (as shown in FIG. 3(a) or FIG. 3(b)) at times $t_1, t_2, t_3 \ldots$, and $t_K$, e.g., using foot tilt angle measurements. Note that $t_K$ denotes the time when the last foot tilt state change (from a leveled state to a tilted state) is detected during the foot gesture. And the corresponding left foot pointing direction angles at $t_1, t_2, t_3, \ldots$, and $t_K$, denoted as $\omega_{L1}, \omega_{L2}, \ldots$, and $\omega_{LK}$, may be maintained. The left foot advanced step-up foot gesture is finished at time $t_e$ when the user's left foot is lifted from the ground, and the change of left foot touch state, e.g., from $\{A|B\}_L$ to $\{\ \}_L$, is detected. At time $t_e$, a control may be generated from the advanced step-up foot gesture with a set of parameters from $\gamma_{Le}, \omega_{Le}, \gamma_{L0}, \omega_{L0}, \omega_{L2}, \ldots, \omega_{LK}$. In various embodiment of the present disclosure, the set of parameters for the (left foot) advanced step-up foot gesture includes a foot tilt angle $\gamma_{Le}$, a first foot-pointing-direction-angle $\omega_{Le}$, i.e., the left foot tilt angle and left foot pointing direction angle at time $t_e$, and a second foot-pointing-direction-angle, which is one of the foot pointing direction angles in $\omega_{L0}, \omega_{L1}, \omega_{L2}, \ldots, \omega_{LK}$. Note that which one of the foot pointing direction angles in $\omega_{L0}, \omega_{L1}, \omega_{L2}, \ldots, \omega_{LK}$ should be used as the second foot-pointing-direction-angle parameter is pre-determined. It may be the foot pointing direction angle obtained when the foot tilt state change is detected for a pre-determined number of times, e.g., the first time, second time, third time, $\ldots$, or n-th time, or the last time.

Accordingly, the left/right foot advanced step-up foot gesture may be detected as follows in various embodiments of the current disclosure. Detect (or determine) if the left/right foot of the user presses the ground, e.g., using touch state of the user's foot. When the left/right foot is determined to start pressing the ground, obtain $\omega_{L0}/\omega_{R0}$ and/or $\gamma_{L0}/\gamma_{R0}$ as needed if they are parameters of the advanced-step foot gesture. When the user's left/right foot is detected (or determined) as pressing the ground, depending on if one or multiple of the left/right foot pointing direction angle(s), i.e., $\omega_{L1}/\omega_{R1}, \omega_{L2}/\omega_{R2}, \ldots, \omega_{LK}/\omega_{RK}$, are needed as parameter(s) of the advanced step-up foot gesture, evaluate the foot tilt state of the user's left/right foot using obtained foot tilt angle of the user's foot; and detect (or determine) the change of the left/right foot from a leveled state to a tilted state for the required number(s) of times, and obtain one or multiple left/right foot pointing direction angle parameter(s) required by the advanced step-up foot gesture, e.g., $\omega_{L1}/\omega_{R1}, \omega_{LK}/\omega_{RK}$, etc. When the user's left/right foot is detected (or determined) as pressing the ground, detect (or determine) when the user's left/right foot stops pressing the ground, e.g., using touch state measurements of the user's foot. After it is determined that the user's left/right foot stops pressing the ground, obtain $\omega_{Le}/\omega_{Re}$ and/or $\gamma_{Le}/\gamma_{Re}$ if they are needed as parameters of the left/right foot advanced step-up foot gesture; and generate a control with the parameters obtained from the advanced step-up foot gesture. In various embodiments of the present disclosure, parameters of the left/right foot advanced step-up foot gesture include a foot tilt angle $\gamma_{Le}/\gamma_{Re}$, a first foot-pointing-direction-angle $\omega_{Le}/\omega_{Re}$, and a second foot-pointing-direction-angle, which is one of the foot pointing direction angles in $\omega_{L0}/\omega_{R0}, \omega_{L1}/\omega_2, \ldots$, and $\omega_{LK}/\omega_{RK}$.

In various embodiments of the disclosure, the (left/right foot) advanced step-up foot gesture for game/application control presented above may be used for various control purposes. For example, ball kick controls are common in games such as football, soccer, etc. Ball kick control in games include kick direction control, kick strength control, and ball spin control (from the kick), which can be naturally achieved with the advanced step-up foot gesture disclosed above.

Figure 9:
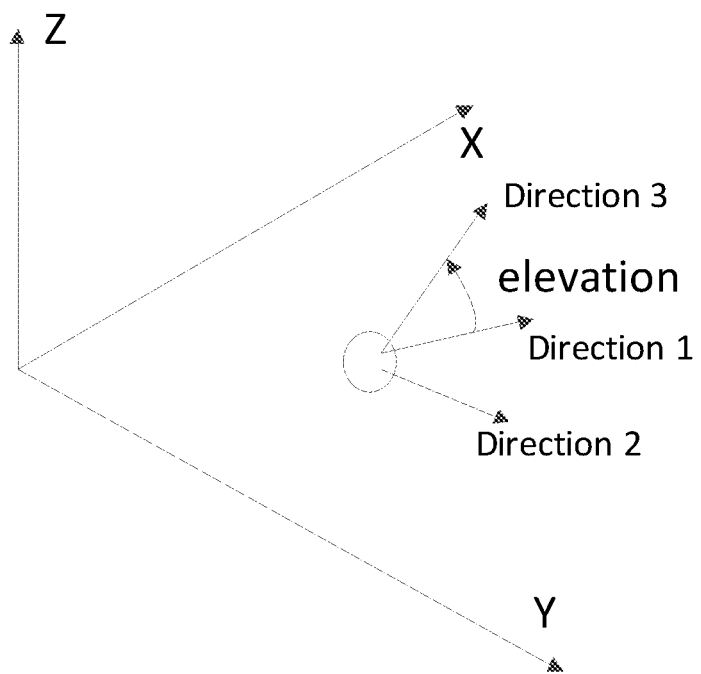
FIG. 9 illustrates direction of a ball kick (or ball kick action) in a 3D game space, determined by an elevation angle and a direction in a 2D (X-Y) game plane according to various embodiments of the present disclosure.
Figure 10:
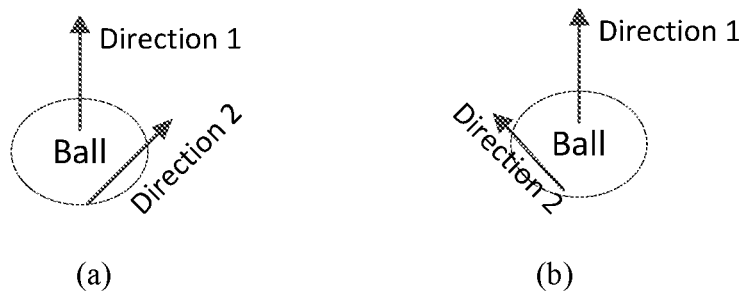
FIG. 10 illustrates an exemplary use of two directions in a 2D (X-Y) plane for control of direction of a ball kick in the plane and spin of the ball from the ball kick according to various embodiments of the present disclosure.

According to various embodiments of the present disclosure, FIG. 9 shows a kick direction of a ball kick action in a game's 3D space, denoted as Direction 3, which can be given by two parameters: i) a kick direction in a 2 dimensional (2D) XY plane, i.e., Direction 1 in FIG. 9, and ii) an elevation angle. Direction 1 in the 2D XY plane may be determined by a foot pointing direction angle from the left/right foot advanced step-up foot gesture, e.g., $\omega_{L1}/\omega_{R1}$ or $\omega_{L2}/\omega_{R2}$, (the second foot-pointing-direction-angle parameter). The elevation angle of the ball kick can be determined by a foot tilt angle parameter from the advanced step-up foot gesture, e.g., $\gamma_{Le}/\gamma_{Re}$. In addition, as illustrated in FIG. 9, in the XY plane, another Direction 2 can be used to control the spin of the kick action. FIG. 10 illustrates the use of an additional 2D direction in the XY plane, denoted as Direction 2, for the spin control of a ball kick action. Jointly Direction 1 and Direction 2 control the direction of the ball kick in the 2D plane, and spin condition of the ball from the ball kick. FIG. 10(a) may correspond a kick generating counter-clockwise ball spin, which may result in the ball flying trajectory curved in one direction. FIG. 10(b) may correspond to a kick generating clockwise ball spin, which may result in the ball flying trajectory curved in another direction in the game. The spin the ball from the ball kick, including direction and degree of the ball spin, may be determined by the (angle) difference between Direction 1 and Direction 2. With the advanced step-up foot gesture, Direction 2 in XY plane may be determined by another foot pointing direction angle, e.g., $\omega_{Le}/\omega_{Re}$ (i.e., the first foot-pointing-direction-angle parameter of the advanced step-up foot gesture).

Note that in the middle of the advanced step-up foot gesture, i.e., when the user's left/right foot is still pressing the ground, a game/application control process 504 may evaluate i) a to-be-determined 2D direction of the ball kick (i.e., Direction 1 in XY plane) in the game/application 503, corresponding to the current (latest) foot pointing direction angle (i.e., $\omega_L$ or $\omega_R$ and/or ii) a to-be-determined elevation of the ball kick corresponding to the current/latest foot tilt angle (i.e., $\gamma_L/\gamma_R$). The to-be-determined 2D direction of the ball kick and the to-be-determined elevation of the ball kick may be visualized in the game/application 503 to the user 500, such that the user 500 knows the result of the advanced step-up foot gesture and can adjust the control accordingly. In addition strength of the ball kick may be controlled by a hand operated trigger, or determined by speed of the user's foot movement obtained after the advanced step-up foot gesture.

Figure 11:
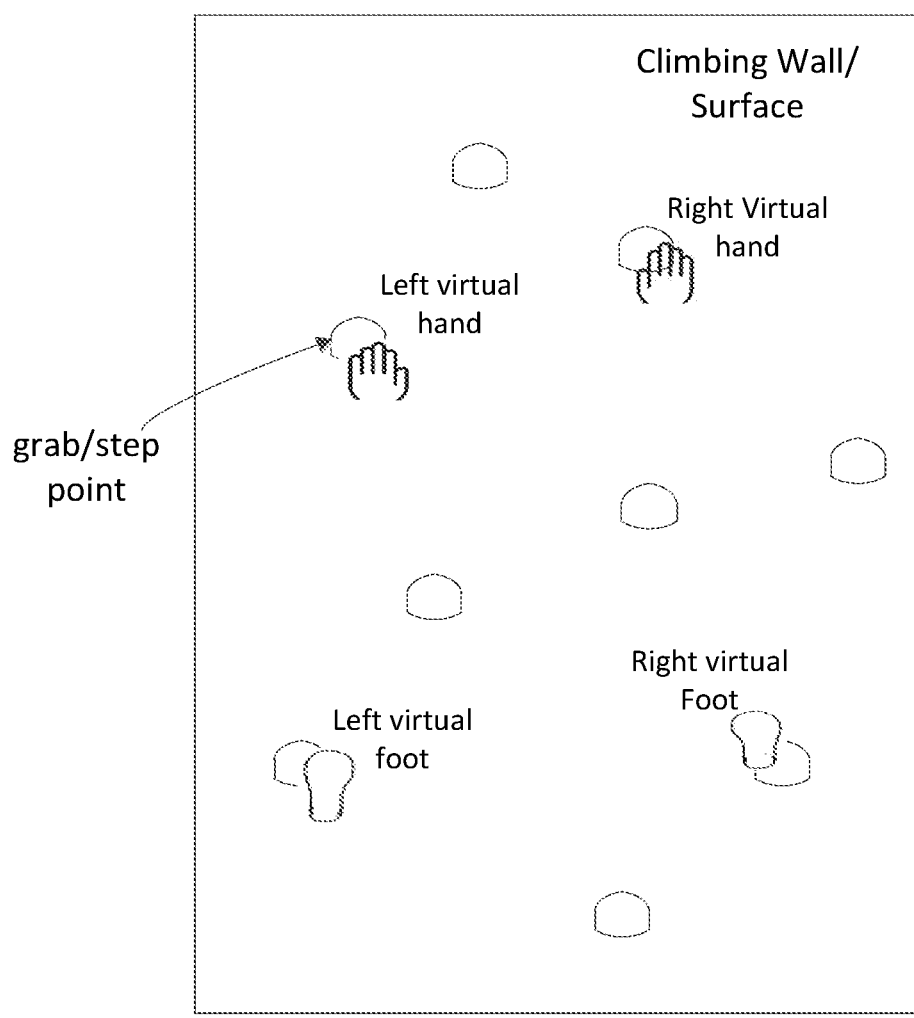
FIG. 11 illustrates a general climbing game setup with grab/step points on a climbing surface/wall according to various embodiments of the present disclosure.

In various embodiments of the disclosure, the advanced step-up foot gesture can be used in climbing games to allow user's foot actions effectively involved in the game play. FIG. 11 illustrates a general climbing game setup with grab/step points on a climbing surface/wall. A user/player controls the virtual hands (e.g., with hand-held game controllers) and virtual feet (with foot-operated controllers, e.g., a foot gesture acquisition device) to hold/step onto selected grab/step points to move in the game. Controls of the virtual left/right foot in climbing games include i) determining a target step point from a set of reachable step points for the left/right foot to step on, and ii) the control of the virtual left/right foot to move to the determined target step point (i.e., selecting the target step point). Embodiments of the advanced step-up foot gesture presented in this disclosure may be used to naturally achieve the control functions above.

Figure 12:
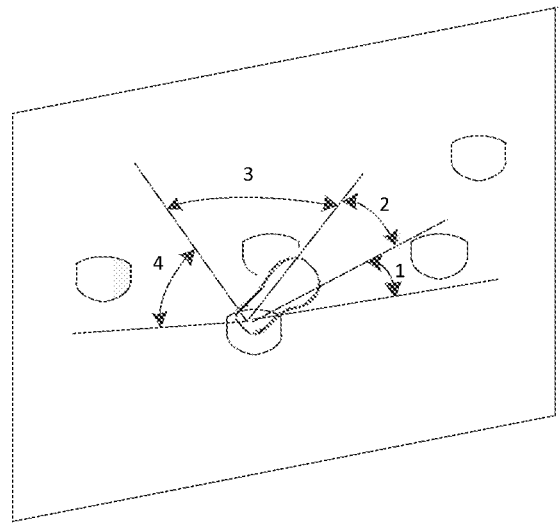
FIG. 12 illustrates an example of a set of reachable step points on a climbing wall/surface according to various embodiments of the present disclosure.

In general, a target step point is determined from a set of reachable step points that is determined based on the currently selected grab and/or step point(s) of the virtual hands and/or virtual feet. FIG. 12 illustrates an example of a set of reachable step points on the climbing wall/surface in game, and a virtual left/right foot on a currently selected step point in the game. With the advanced step-up foot gesture, the selected target step point can be determined by the foot pointing direction angle parameter, e.g., $\omega_{Le}$ (for left foot), or $\omega_{Re}$ (for right foot) (i.e., the first foot pointing-direction-angle parameter) using a mapping from the foot pointing direction angle to the reachable target step points. As illustrated in FIG. 12, when the virtual foot pointing direction (controlled by $\omega_L/\omega_R$) falls in a range, a corresponding step point may be determined as the target step point. Alternatively, the target step point may be determined by the difference of two foot pointing direction angle parameters from the advanced step-up foot gesture e.g., $\omega_{Le}-\omega_{L0}$, or $\omega_{Le}-\omega_{L1}$ (for left foot), and $\omega_{Re}-\omega_{R0}$ (for right foot) (i.e., the difference between the first foot-pointing-direction-angle parameter and the second foot-pointing-direction-angle parameter of an advanced step-up foot gesture) using a mapping from the angle difference to the set of reachable step points.

Additional requirements on foot tilt angle parameters, e.g., $\gamma_{Le}$ for left foot and $\gamma_{Re}$ for right foot may be added to determine if a step action to the target step point should be performance in game. For example, it can be required that the user's foot need to be in a tilted state with the absolute value of $\gamma_{Le}$ or $\gamma_{Re}$ being larger than a threshold for the virtual foot to move to the target step point after an advanced step-up foot gesture. Otherwise, no step action will be executed in the game.

Figure 13:
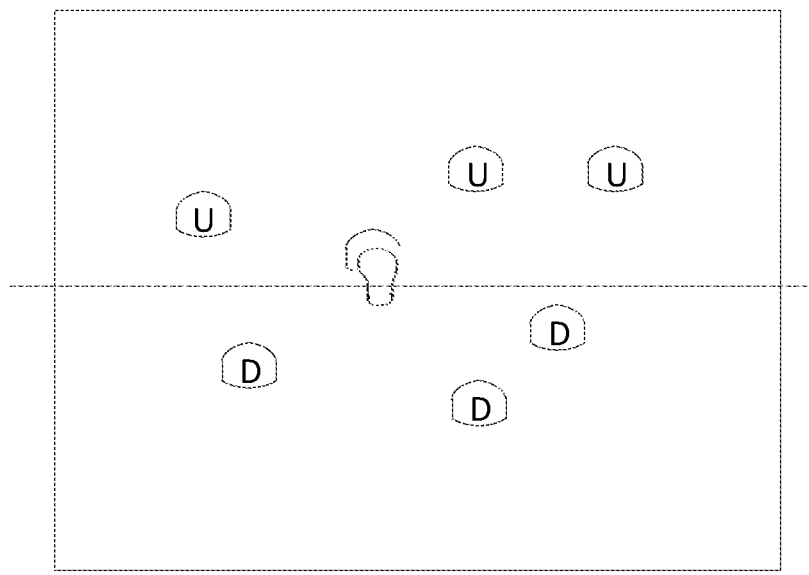
FIG. 13 illustrates a scenario where reachable step points for user's left/right foot are divided into two sub-sets according to various embodiments of the present disclosure.

Foot tilt angle parameter of the advanced step-up foot gesture, e.g., $\gamma_{Le}/\gamma_{Re}$, may also be used for the selection of the target step point. FIG. 13 shows an example scenario where the reachable step points for user's left/right foot are divided into two sub-sets. One set contains step points that are considered as upward step points. The other set contains step points are considered as downward step points. The Foot tilt angle parameter may be used to determine from which set of step points the target step point should be selected. For example, $\gamma_{Le}/\gamma_{Re}$ is larger than a positive threshold, the target step point is one from the set of upward step points; when $\gamma_{Le}/\gamma_{Re}$ is smaller than a negative threshold, the target step point is one from the set of downward step points. It can be seen that, with the left/right foot advanced step-up foot gesture as the control, the target step point may be determined by $\gamma_{Le}/\gamma_{Re}$ and a foot pointing direction angle, e.g., $\omega_{Le}/\omega_{Re}$, or the angle difference of two foot pointing direction angles e.g., $\omega_{Le}-\omega_{L0}$ or $\omega_{Re}-\omega_{R0}$, from an advanced step-up foot gesture.

Note that, in various embodiments of the disclosure, before the advanced step-up foot gesture is completed, i.e., when the user's left/right foot is still pressing the ground, a to-be-selected target step point corresponding to the current/latest user left/right foot pointing direction angle $\omega_L/\omega_R$ and foot tilt angle $\gamma_L/\gamma_R$., may be identified and visualized in the game/application, such that the user/player knows the result of the advanced step-up control action, and can adjust the control accordingly to select a desired target step point. The to-be-selected target step point may be found as the target step point determined by using the current/latest foot pointing direction angle $\omega_L/\omega_R$ and foot tilt angle $\gamma_L/\gamma_R$ as the parameters of the advanced step-up foot gesture $\omega_{Le}/\omega_{Re}$ and $\gamma_{Le}/\gamma_{Re}$.

In various embodiments of the disclosure, the advanced step-up foot gesture many be used for the change of a selected item in various games and applications. The items may be objects in various games and applications. In climb games, the items are step points; in GUI applications, the items may be GUI items including menu items and application icons.

The advanced step-up foot gesture may provide multiple parameters including a first foot-pointing-direction-angle (e.g., $\omega_{Le}/\omega_{Re}$), a second foot-pointing-direction-angle (e.g., $\omega_{L1}/\omega_{R1}$) and a foot-tilt-angle (e.g., $\gamma_{Le}/\gamma_{Re}$). In general, based on a currently selected item, a set of "reachable" items may be determined. Then a mapping from the first foot-pointing-direction-angle parameter, e.g., $\omega_{Le}$ or $\omega_{Re}$ or the difference between the first foot-pointing-direction-angle parameter and the second foot-pointing-direction-angle parameter, e.g., $\omega_{Le}-\omega_{L0}$ or $\omega_{Re}-\omega_{R0}$, and the foot-tilt-angle parameter, e.g., $\gamma_{Le}$ or $\gamma_{Re}$ to the set of "reachable" items may be determined, which allows the determination of one or none of the "reachable" items as a target item using parameters from the (left/right foot) advanced step-up foot gesture. When an advanced step-up foot gesture is completed/detected (when the user's foot is detected to leave the ground), the first foot-pointing-direction-angle parameter, e.g., $\omega_{Le}$ or $\omega_{Re}$, or the difference between the first foot-pointing-direction-angle parameter and the second foot-pointing-direction-angle parameter, e.g., $\omega_{Le}-\omega_{L0}$ or $\omega_{Re}-\omega_{R0}$ or $\omega_{Re}-\omega_{R1}$, and the foot-tilt-angle parameter, e.g., $\gamma_{Le}$ or $\gamma_{Re}$ may be obtained/determined. Based on parameters from the advanced step-up foot gesture and the mapping to the "reachable" items, a target item may be determined from the reachable "items", and a control of selecting the target item may be generated.

Note that before the advanced step-up foot gesture is completed, i.e., when the user's left/right foot is still pressing the ground, a to-be-selected target item corresponding to the current/latest foot pointing direction $\omega_L/\omega_R$ and foot tilt angle $\gamma_L/\gamma_R$ may be determined and visualized in the game/application, such that the user/player knows the result of the advanced step-up control action, and can adjust the control accordingly to select a desired target item. The to-be-selected target item may be found as the target item determined by using the current/latest foot pointing direction angle $\omega_L/\omega_R$ and foot tilt angle $\gamma_L/\gamma_R$ as the parameters of the advanced step-up foot gesture $\omega_{Le}/\omega_{Re}$ and $\gamma_{Le}/\gamma_{Re}$. Note that the second foot-pointing-direction-angle of the advanced step-up foot gesture is determined and available when the user's left/right foot is still pressing the ground, which can be used for the evaluation of the to-be-selected target item.

Figure 14:
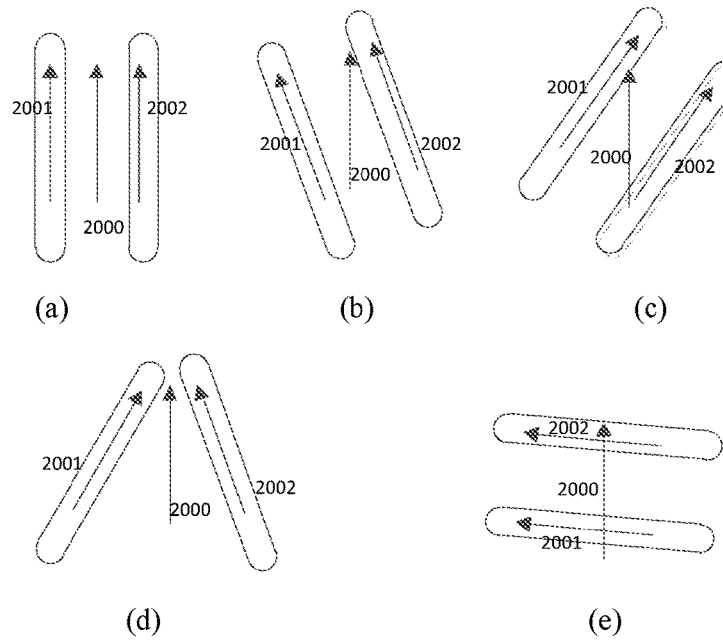
FIG. 14 illustrates, in an example ski game, various cases of virtual foot pointing directions in the game with respect to a current moving direction in the game's 2D plane according to various embodiments of the present disclosure.

In sport games such as ski, snow board, skating, movement of the game character is controlled by the relationship between the (2D) pointing direction(s) of a virtual foot/feet that correspond to the pointing direction(s) of snow board, ski board, skating blade in a 2D plane of the game space, and a current movement direction in the 2D plane of the game space. FIG. 14 illustrates, in an example ski game according to various embodiments of the present disclosure, various cases of virtual foot pointing directions (corresponding to the pointing directions of the ski boards, i.e., 2001 and 2002), and a current movement direction 2000 of the game character in a 2D plane of the game space.

FIG. 14(*a*) shows a case when left and right virtual foot pointing directions, i.e., 2001 and 2002, are aligned with the game character's movement direction 2000, which corresponds to a control for moving straight along the current movement direction 2000. The case in FIG. 14(*b*) may correspond to a control for left turn. The turn rate may be further controlled by the angle differences between virtual foot pointing directions 2001, 2002 and current movement direction 2000. The case in FIG. 14(*c*) may correspond to a control for right turn of the game character. The case in FIG. 14(*d*) may correspond to a control of for brake. The case in FIG. 14(*e*) may correspond to a control for parallel brake.

In various embodiments of the current disclosure, foot gesture based movement control methods in games such as ski, skating, include i) determining the pointing direction(s) of the virtual foot/feet in 2D game space using measured user left and/or right foot pointing direction(s), ii) determining movement controls including moving straight, turns, brakes, etc., based on the difference(s) between the 2D virtual foot pointing direction(s) and the current movement direction of the game character in a 2D plane of the game space. Foot touch states of a user's left foot and right foot may be used to determine if the corresponding left/right virtual foot (and the corresponding left/right ski board, snow board, skate blade) is pressing/touching the ground in the game, which can be used to determine if left and/or right virtual foot pointing direction(s) should be used for movement control of the game character.

In various embodiments of the disclosure, the character's movement direction 2000 may correspond to a reference foot pointing direction of the user/player. For example, the reference foot pointing direction, $\omega_{Lref}$ or $\omega_{Rref}$, may be set as the left/right foot pointing direction angle of the user when the current character movement is started; or the reference foot pointing direction angle(s) may be pre-determined user foot pointing direction angle(s) with a calibration process as disclosed in this invention. In such cases, the angle difference between a 2D virtual foot pointing direction, i.e., 2001 or 2002, and the current movement direction of the game character 2000 may be derived from the angle difference of the obtained user foot pointing direction angle and the reference foot pointing direction angle, e.g., $\omega_L - \omega_{Lref}$ or $\omega_R - \omega_{Rref}$.

The present disclosure also provides a computer-readable storage medium storing program instructions. The program instructions may be loaded to a computer or a processor of a programmable data processing device, such that the program instructions are executed by the computer or the processor of the programmable data processing device to implement the disclosed methods.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed:

1. A method for controlling a game character using foot gestures of a user, applied to a game device, comprising:
performing a four-way movement start control process to control a start direction for moving the game character, including:
determining whether the game character is in a non-moving state;
in response to the game character being in the non-moving state, obtaining a first foot tilt angle of left foot and a second foot tilt angle of right foot of the user;
determining a first tilt state of the left foot and a second tilt state of the right foot of the user, based on the first foot tilt angle and the second foot tilt angle; and
determining a tilt state change of each of the right foot and the left foot of the user,
when the right foot of the user is detected changing from a leveled state to a positively tilted state, generating a movement start control used to control the game character to start moving in a first direction,
when the right foot of the user is detected changing from a leveled state to a negatively tilted state, generating a movement start control used to control the game character to start moving in a second direction,
when the left foot of the user is detected changing from a leveled state to a positively tilted state, generating a movement start control used to control the game character to start moving in a third direction, and
when the left foot of the user is detected changing from a leveled state to a negatively tilted state, generating a movement start control used to control the game character to start moving in a fourth direction.

2. The method according to claim 1, in the four-way movement start control process, further comprising:
determining one or both of the right and left feet press on ground, before generating the movement start control in one or more of first, second, third, and fourth directions.

3. The method according to claim 1, in the four-way movement start control process, further comprising:
determining a changing rate of a foot pointing direction of each of the left foot and the right foot, before generating the movement start control in one or more of first, second, third, and fourth directions, wherein the changing rate of the foot pointing direction of each of the left foot and the right foot is required to be approximately zero for generating the movement start control in each direction of the first, second, third, and fourth directions.

4. The method according to claim 1, further comprising:
performing a movement type control process, including:
determining the game character being in a moving state,
during an on-going movement of the game character, detecting user's walk and run actions to provide a detection result, and
controlling a type and/or speed of the on-going movement of the game character according to the detection result.

5. The method according to claim 1, further comprising:
performing a movement direction control process, including:
obtaining a foot pointing direction of each of one or both feet of the user, and
according to the foot pointing directions of one or both feet of the user, determining and updating the first, second, third and/or fourth directions in a game space.

6. The method according to claim 1, further comprising:
performing a movement stop process, including:
determining the game character being in a moving state,
obtaining a foot tilt angle of the left foot and/or a foot tilt angle the right foot of the user, and
determining a tilt state of at least one of the left and right feet of the user,
determining a tilt state change of the at least one of the left and right feet of the user that is changed from a leveled state to a tilted state, and
generating a control to stop an on-going movement of the game character based on the determined tilt state change.

7. The method according to claim 6, in the movement stop process, further comprising:
determining one or both of the right and left feet press on ground, before generating the control to stop the on-going movement in one or more of first, second, third, and fourth directions.

8. A game device, comprising:
a memory, configured to store program instructions for performing a method for controlling a game character using foot gestures of a user; and
a processor, coupled with the memory and, when executing the program instructions, configured to:
perform a four-way movement start control process to control a start direction for moving the game character, including:
determining whether the game character is in a non-moving state;
in response to the game character being in the non-moving state, obtaining a first foot tilt angle of left foot and a second foot tilt angle of right foot of the user;
determining a first tilt state of the left foot and a second tilt state of the right foot of the user, based on the first foot tilt angle and the second foot tilt angle; and
determining a tilt state change of each of the right foot and the left foot of the user,
when the right foot of the user is detected changing from a leveled state to a positively tilted state, generating a movement start control used to control the game character to start moving in a first direction,
when the right foot of the user is detected changing from a leveled state to a negatively tilted state, generating a movement start control used to control the game character to start moving in a second direction,
when the left foot of the user is detected changing from a leveled state to a positively tilted state, generating a movement start control used to control the game character to start moving in a third direction, and
when the left foot of the user is detected changing from a leveled state to a negatively tilted state, generating a movement start control used to control the game character to start moving in a fourth direction.

9. The device according to claim 8, wherein in the four-way movement start control process, the processor is further configured to:
determine one or both of the right and left feet press on ground, before generating the movement start control in one or more of first, second, third, and fourth directions.

10. The device according to claim 8, wherein, in the four-way movement start control process, the processor is further configured to:
determine a changing rate of a foot pointing direction of each of the left foot and the right foot, before generating the movement start control in one or more of first, second, third, and fourth directions, wherein the changing rate of the foot pointing direction of each of the left foot and the right foot is required to be approximately zero for generating the movement start control in each direction of the first, second, third, and fourth directions.

11. The device according to claim 8, wherein the processor is further configured to:
perform a movement type control process, including:
determining the game character being in a moving state,
during an on-going movement of the game character, detecting user's walk and run actions to provide a detection result, and
controlling a type and/or speed of the on-going movement of the game character according to the detection result.

12. The device according to claim 8, wherein the processor is further configured to:
perform a movement direction control process, including:
obtaining a foot pointing direction of each of one or both feet of the user, and
according to the foot pointing directions of one or both feet of the user, determining and updating the first, second, third and/or fourth directions in a game space.

13. The device according to claim 8, wherein the processor is further configured to:
perform a movement stop process, including:
determining the game character being in a moving state,
obtaining a foot tilt angle of the left foot and/or a foot tilt angle the right foot of the user, and
determining a tilt state of at least one of the left and right feet of the user,
determining a tilt state change of the at least one of the left and right feet of the user that is changed from a leveled state to a tilted state, and
generating a control to stop an on-going movement of the game character based on the determined tilt state change.

14. The device according to claim 13, wherein, in the movement stop process, the processor is further configured to:
determine if one or both of the left foot and the right foot is pressing ground, before generating the control to stop the on-going movement in one or more of first, second, third, and fourth directions.

15. A non-transitory computer-readable storage medium, containing program instructions for, when executed by a processor, performing a method for controlling a game character using foot gestures of a user, the method comprising:
  performing a four-way movement start control process to control a start direction for moving the game character, including:
    determining whether the game character is in a non-moving state;
    in response to the game character being in the non-moving state, obtaining a first foot tilt angle of left foot and a second foot tilt angle of right foot of the user;
    determining a first tilt state of the left foot and a second tilt state of the right foot of the user, based on the first foot tilt angle and the second foot tilt angle; and
    determining a tilt state change of each of the right foot and the left foot of the user,
    when the right foot of the user is detected changing from a leveled state to a positively tilted state, generating a movement start control used to control the game character to start moving in a first direction,
    when the right foot of the user is detected changing from a leveled state to a negatively tilted state, generating a movement start control used to control the game character to start moving in a second direction,
    when the left foot of the user is detected changing from a leveled state to a positively tilted state, generating a movement start control used to control the game character to start moving in a third direction, and
    when the left foot of the user is detected changing from a leveled state to a negatively tilted state, generating a movement start control used to control the game character to start moving in a fourth direction.

16. The storage medium according to claim 15, in the four-way movement start control process, the method further comprising:
  determining one or both of the right and left feet press on ground, before generating the movement start control in one or more of first, second, third, and fourth directions.

17. The storage medium according to claim 15, in the four-way movement start control process, the method further comprising:
  determining a changing rate of a foot pointing direction of each of the left foot and the right foot, before generating the movement start control in one or more of first, second, third, and fourth directions, wherein the changing rate of the foot pointing direction of each of the left foot and the right foot is required to be approximately zero for generating the movement start control in each direction of the first, second, third, and fourth directions.

18. The storage medium according to claim 15, the method further comprising:
  performing a movement type control process, including:
    determining the game character being in a moving state,
    during an on-going movement of the game character, detecting user's walk and run actions to provide a detection result, and
    controlling a type and/or speed of the on-going movement of the game character according to the detection result.

19. The storage medium according to claim 15, the method further comprising:
  performing a movement direction control process, including:
    obtaining a foot pointing direction of each of one or both feet of the user, and
    according to the foot pointing directions of one or both feet of the user, determining and updating the first, second, third and/or fourth directions in a game space.

20. The storage medium according to claim 15, the method further comprising:
  performing a movement stop process, including:
    determining the game character being in a moving state,
    obtaining a foot tilt angle of the left foot and/or a foot tilt angle the right foot of the user, and
    determining a tilt state of at least one of the left and right feet of the user,
    determining a tilt state change of the at least one of the left and right feet of the user that is changed from a leveled state to a tilted state, and
    generating a control to stop an on-going movement of the game character based on the determined tilt state change, after determining one or both of the right and left feet press on ground.

* * * * *